US009254829B2

(12) United States Patent
Jeon et al.

(10) Patent No.: US 9,254,829 B2
(45) Date of Patent: Feb. 9, 2016

(54) PUSHING FORCE CONTROLLING APPARATUS FOR PEDAL SIMULATOR

(71) Applicant: Hyundai Motor Company, Seoul (KR)

(72) Inventors: Gab Bae Jeon, Gyeonggi-do (KR); Jae Il Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 491 days.

(21) Appl. No.: 13/855,950

(22) Filed: Apr. 3, 2013

(65) Prior Publication Data

US 2014/0157771 A1 Jun. 12, 2014

(30) Foreign Application Priority Data

Dec. 12, 2012 (KR) .................. 10-2012-0144292

(51) Int. Cl.
*F15B 7/00* (2006.01)
*B60T 17/08* (2006.01)
*B60T 7/04* (2006.01)
*B60T 8/40* (2006.01)

(52) U.S. Cl.
CPC ................ *B60T 17/08* (2013.01); *B60T 7/042* (2013.01); *B60T 8/4086* (2013.01)

(58) Field of Classification Search
CPC ........ B60T 17/08; B60T 8/409; B60T 8/4086
See application file for complete search history.

(56) References Cited

U.S. PATENT DOCUMENTS

2014/0117602 A1*  5/2014  Jeon ....................... B60T 7/042
                                                  267/170

FOREIGN PATENT DOCUMENTS

| JP | 11-105699 | 4/1999 |
| JP | 2000-135976 A | 5/2000 |
| JP | 2005-112034 A | 4/2005 |
| JP | 2012030789 A | 2/2012 |
| JP | 2012153367 A | 8/2012 |
| KR | 10-2002-0081383 A | 10/2002 |
| KR | 10-2005-0075027 A | 7/2005 |
| KR | 10-2011-0021357 | 3/2011 |
| KR | 10-2012-0054229 | 5/2012 |

* cited by examiner

*Primary Examiner* — Edward Look
*Assistant Examiner* — Daniel Collins
(74) *Attorney, Agent, or Firm* — Mintz Levin Cohn Ferris Glovsky and Popeo, P.C.; Peter F. Corless

(57) ABSTRACT

A pushing force controlling apparatus for a pedal simulator that includes a simulator cylinder in which a first pipe and a second pipe extending from a master cylinder are connected to a front side and a rear side thereof, respectively. A first solenoid valve and a second solenoid valve are installed in the first pipe and the second pipe, respectively and a first piston and a second piston are disposed at a front side and a rear side of an interior of the simulator cylinder. A buffering member is installed between the first piston and the second piston, and pedal pushing force characteristics are controlled by variably setting a position of the second piston in the simulator cylinder using an amount of fluid provided from the master cylinder during an operation of a pedal.

6 Claims, 6 Drawing Sheets

PUSHING FORCE CONTROLLING APPARATUS FOR PEDAL SIMULATOR

CROSS-REFERENCE TO RELATED APPLICATION

This application claims under 35 U.S.C. §119(a) the benefit of Korean Patent Application No. 10-2012-0144292 filed Dec. 12, 2012 the entire contents of which are incorporated herein by reference.

BACKGROUND (a) Technical Field

The present invention relates to a pedal force controlling apparatus for a brake pedal simulator, and more particularly to an apparatus that controls push force characteristics of a pedal in a brake system employing a pedal simulator.

(b) Background Art

In general, a brake-by-wire system for a vehicle refers to a system which does not include a mechanical connection between a driver and a brake wheel but allows electric calipers disposed within the wheels of the vehicle and controlled by a controller to hold disks disposed within the electric calipers of the wheels to brake the vehicle. Brake-by-wire systems include electromechanical brakes using power of an actuator having a 12V motor as wheel disk braking power, and electro-wedge brakes having regenerative motor power with a wedge structure for wheel disk braking power to create high braking power.

A brake-by-wire system includes a mechanical apparatus that provides hydraulic pushing force characteristics to allow a driver to feel pressure during a manipulation of a pedal and an electric apparatus that recognizes a pedal intention of the driver, wherein a pedal simulator is used as the electric apparatus. The pedal simulator generally employs a pushing force by a rubber damper or a spring, a magnetic force by a magnet, and a viscosity change of an magentorheological (MR) fluid, and detects pedal force characteristics, for example, of hydraulic pressure while not employing hydraulic pressure, providing an adequate pedal force to the driver.

A known developed technology controls an initial mounting load of a stroke simulator spring with a motor and a controller to change pushing force characteristics of a pedal, and controls pushing force characteristics based on a travel condition of the vehicle with a travel state detection mechanism of the vehicle. Accordingly, the system includes a brake manipulating member; a controller that is configured to change the pushing force/stroke characteristics, detect an operation state/travel environment, and operate a pushing force/stroke based on a travel state of the vehicle.

However, the developed technology requires a motor, a gear, and a screw, and a separate mechanism that controls the motor as well, resulting in an increase in manufacturing costs, an increase in weight, and a complexity of the structure, and a difficulty in packaging.

SUMMARY

The present invention provides a pushing force controlling apparatus for a pedal simulator wherein the pedal pushing force characteristics may be changed by varying a set position of a piston using a hydraulic pressure provided from a master cylinder during an operation of a brake pedal, and applying a pushing force based on a change of position of the piston to a pedal, thus increasing a driver satisfaction by allowing the driver to arbitrarily change pedal pushing force based on an intention of the driver, and controlling various pedal pushing force characteristics by adding less components than the related art while reducing manufacturing costs and weight.

In accordance with an aspect of the present invention, a pushing force controlling apparatus for a pedal simulator, may include: a simulator cylinder in which a first pipe and a second pipe extending from a master cylinder are connected to a front side and a rear side thereof, respectively; a first solenoid valve and a second solenoid valve installed in the first pipe and the second pipe, respectively; a first piston and a second piston disposed at a front side and a rear side of an interior of the simulator cylinder; and a buffering member installed between the first piston and the second piston, wherein pedal pushing force characteristics are controlled by variably setting a position of the second piston in the simulator cylinder using an amount of fluid provided from the master cylinder during an operation of a pedal.

In an embodiment of the present invention, the pedal pushing force characteristics may be differently controlled by varying the setting areas of the first piston and the second piston in the simulator cylinder.

In another embodiment of the present invention, an amount of fluid provided into the simulator cylinder to set a position of the second piston may be controlled based on an opening/closing time of a solenoid valve corresponding to a signal detected by the pedal stroke sensor or an operation time of the pedal.

In still another embodiment of the present invention, the buffering member interposed between the first piston and the second piston may correspond to a spring, a rubber, and a combination of the spring and the rubber.

In yet another embodiment of the present invention, the first solenoid valve may be connected to a first chamber of the simulator cylinder and the second solenoid valve may be connected to a second chamber of the simulator cylinder to allow the amounts of fluid entering the chambers to be controlled based on the opening/closing operations of the solenoid valves.

Thus, the pushing force controlling apparatus according to the present invention has the following advantages. First, since a pushing force of a pedal may be arbitrarily changed when a driver selects a driving mode, satisfaction of the driver may be improved and product value may be improved. Second, since various pedal pushing force characteristics may be changed by adding only one of a spring, a rubber, a piston, and a solenoid valve, manufacturing costs and weight may be reduced as compared with a method employing a motor as in the related art.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
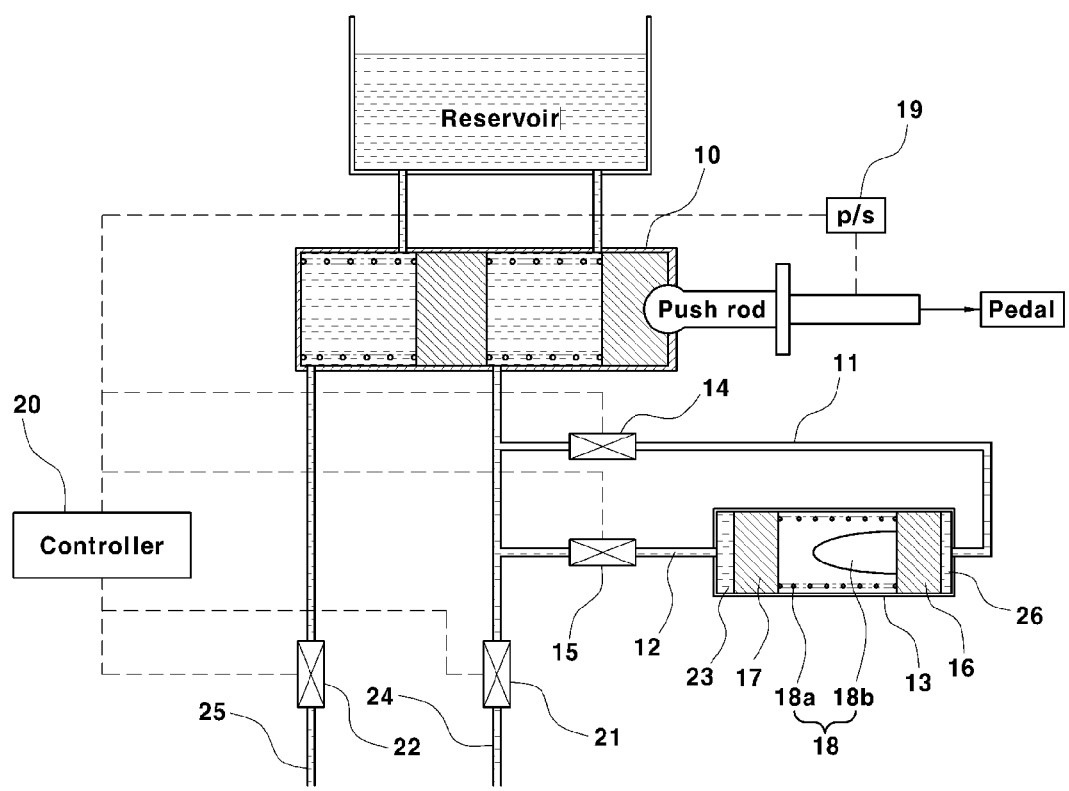
FIG. 1 is an exemplary schematic diagram showing a pushing force controlling apparatus for a pedal simulator according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

FIG. 1 is an exemplary schematic diagram showing a pushing force controlling apparatus for a pedal simulator according to an exemplary embodiment of the present invention. As shown in FIG. 1, the pushing force controlling apparatus for a pedal simulator may be configured to control a set position of a valve in a simulator cylinder using an amount of fluid sent from a master cylinder to a simulator cylinder during an operation of a pedal to variably control pedal pushing force characteristics.

In particular, a master cylinder 10 of a brake apparatus of the vehicle and a simulator cylinder 13 configured to provide the driver with a pedal feeling are provided respectively, and the master cylinder 10 and the simulator cylinder 13 may be connected through two pipes to allow fluid to be sent from the master cylinder 10 to the simulator cylinder 13. In other words, a main pipe 24 and a sub-pipe 25 including a solenoid value 21 and a sub-solenoid value 22, respectively may extend toward and into the master cylinder 10, and a first pipe 11 branched from the main pipe 24 may be connected to a rear side of the simulator cylinder 13 and a second pipe 12 may be simultaneously connected to the simulator cylinder 13. Accordingly, an amount of fluid discharged from the master cylinder 10 along the main pipe 24 may be sent to the simulator cylinder 13 through the first pipe 11 and the second pipe 12.

A first solenoid valve 14 and a second solenoid valve 15 may be installed within the first pipe 11 and the second pipe 12, respectively such to allow an amount of fluid set to the cylinder 3 may be blocked by the first solenoid valve 14 and the second solenoid valve 15. In particular, when a "normally open" (NO) type valve is used as the first solenoid valve 14 and a "normally closed" (NC) type valve is used as the second solenoid valve 15, the number of controls of the valves and power consumption may be reduced.

Two pistons, that is, a first piston 16 disposed at a front side of the cylinder and a second piston 17 disposed at a rear side of the cylinder may be installed within the simulator cylinder 13. Accordingly, a first chamber 26 may be formed between the first piston 16 and a wall surface of the cylinder by an amount of fluid introduced through the first pipe 11 while the first piston 16 is moved rearward and a second chamber 23 may be formed between the second piston 17 and the wall surface of the cylinder by an amount of fluid introduced through the second pipe 12 while the second piston 17 is moved forward.

A buffering member 18 may be interposed between the first piston 16 and the second piston 17, which are supported by each other by using the buffering member 18. In particular, the buffering member 18 may employ various forms such as a form of using a spring 18a alone, a form of using a rubber 18b alone, and a form of using both the spring 18a and the rubber 18b.

A controller 20, for example, a brake controller may be configured to operate the first solenoid valve 14 installed in the first pipe 11 and the second solenoid valve 15 installed in the second pipe 12, thus the amount of fluid entering the chambers 26 and 23 of the simulator cylinder 13 may be controlled by operating the first solenoid 14 and the second solenoid 15 with the controller 20. In other words, to set a position of the second piston 17 or the first piston 16, the controller 20 may be configured to receive a signal detected by a pedal stroke sensor 19 or a signal (e.g., a signal from a pedal position sensor) for an operation time of the pedal and may be configured to operate an opening/closing time of the second solenoid valve 15 or the first solenoid valve 14 to control an amount of fluid entering the simulator cylinder 13.

For example, a pedal operation starting signal may be input to the controller 20, the controller may be configured to operate an opening/closing time of the first solenoid valve 14 or the second solenoid valve 14 to control amounts of fluid entering the chambers 26 and 23 of the simulator cylinder 13 through the first pipe 11 and the second pipe 12. In other words, the controller 20 may be configured to count the time from a pedal operation starting time to open a valve only for a preset time, thereby controlling amounts of fluid entering the chambers.

As the valves are opened and closed over time, the amount of fluid entering the first chamber 26 of the first piston 16 and the second chamber 23 of the second piston 17 may be controlled, thus, the positions of the first piston 16 and the second piston 17 may be determined based the amounts of fluid that entered the chambers.

As another example, the controller 20 may be configured to receive a signal of the pedal stroke sensor 19 to operate an opening/closing time of the first solenoid valve 14 or the second solenoid valve 14, thus controlling the amounts of fluid entering the chambers 26 and 23 of the simulator cylinder 13 through the first pipe 11 and the second pipe 12. In other words, the controller 20 may be configured to receive a signal from the pedal stroke sensor 19 to open a valve only within a preset stroke range, thereby controlling the amounts of fluid entering the chambers.

Therefore, the method of controlling the set position of the first piston 16 or the second piston 17 by controlling of the amounts of fluid may be performed through selection of a mode by a user, and when the user selects different modes such as Mode 1, Mode 2, and Mode 3, the controller 20 may be configured to control the amounts of fluid entering into the chambers based on the selected mode to set the positions of the first piston 16 and the second piston 17 differently. Specifically, any well-known method for determining the amounts of fluid corresponding to the modes may be employed without being limited specifically.

Figure 2A:
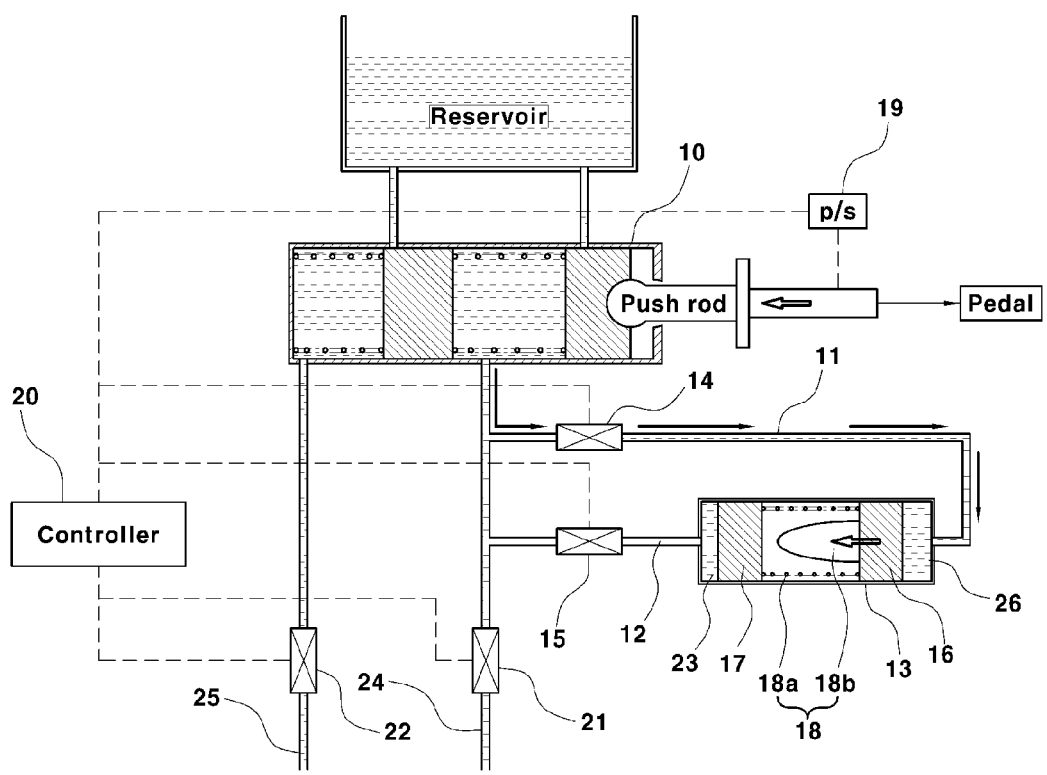
FIGS. 2A and 2B are exemplary schematic diagrams showing in-use states of the pushing force controlling apparatus for a pedal simulator of FIG. 1 according to an exemplary embodiment of the present invention.
Figure 2B:
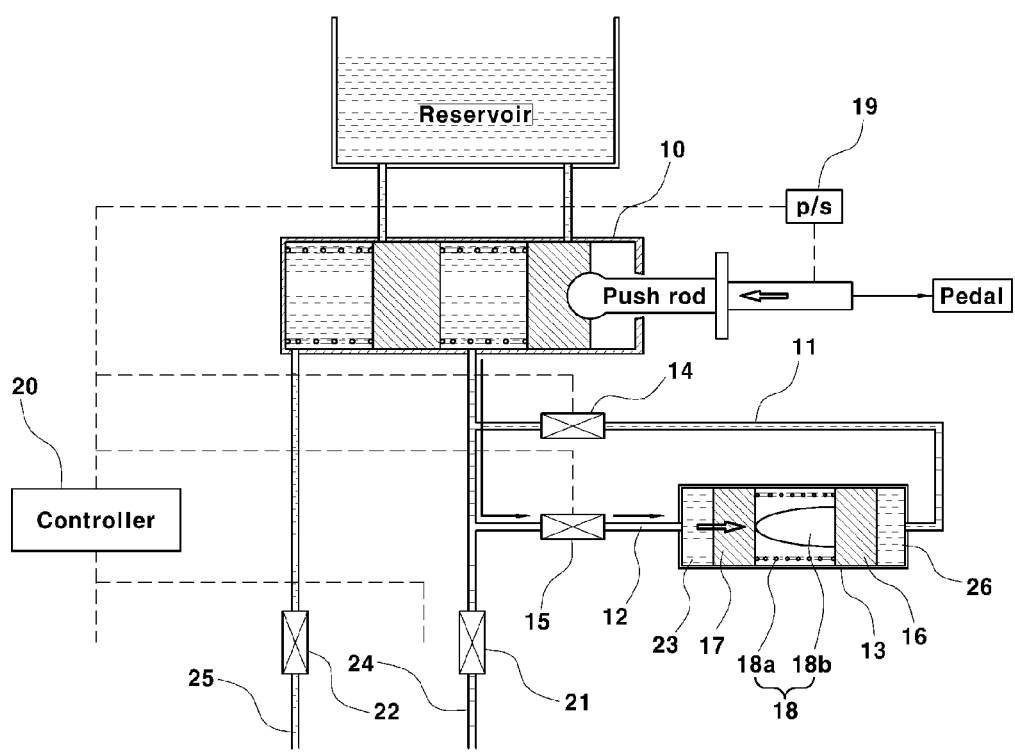

Thus, an in-use state of the pushing force controlling apparatus for a pedal simulator will be described below. FIGS. 2A and 2B are exemplary schematic diagrams showing in-use states of the pushing force controlling apparatus for a pedal simulator of FIG. 1.

As shown in FIGS. 2A and 2B, the main valve 21 installed in the main pipe 24 is closed, and as an example, when a pedal is operated while the user selects pushing force characteristics of Mode 1, information by the pedal stroke sensor 19 may be transferred to the controller 20. Subsequently, during the first braking operation (performed after a mode is input), the second solenoid valve 15 may be opened when the main piston of the master cylinder 10 moves forward, and the second piston 17 is moved by closing the first solenoid valve 14 and a predetermined amount of fluid is filled in the second chamber 23.

Furthermore, when a predetermined amount of fluid is filled in the second chamber 23, the second solenoid valve 15 may be closed and the first solenoid valve 14 may be opened. The pushing force generated when a pedal stroke additionally occurs may be generated by the first piston 16 and the buffering member 18. During the second braking operation after the first braking operation is released, the second solenoid valve 15 may remain closed, and then the second piston 17 may be moved toward the buffering member 18 (e.g., forward). In particular, an initial load of the buffering member 18 may be different from that of the buffering member 18 before the second piston 17 is moved. When the first piston 16 is moved by opening the first solenoid valve 14 during the operation of the pedal, pushing force may be generated in the pedal depends on the position of the second piston.

Further, when pedal pushing force characteristics are to be changed (e.g., pushing force characteristics of Mode 2 are selected), the second solenoid valve 15 may be opened during the first braking operation after the pushing force characteristics are changed, and a position of the second piston may be set differently based on a control of the amount of fluid through the method after the first solenoid valve 14 is closed, making the pushing force characteristics of Mode 2 different from Mode 1. Pushing force characteristics of various modes such as Mode 1, Mode 2, and Mode 3 may be obtained through the method.

Figure 3:
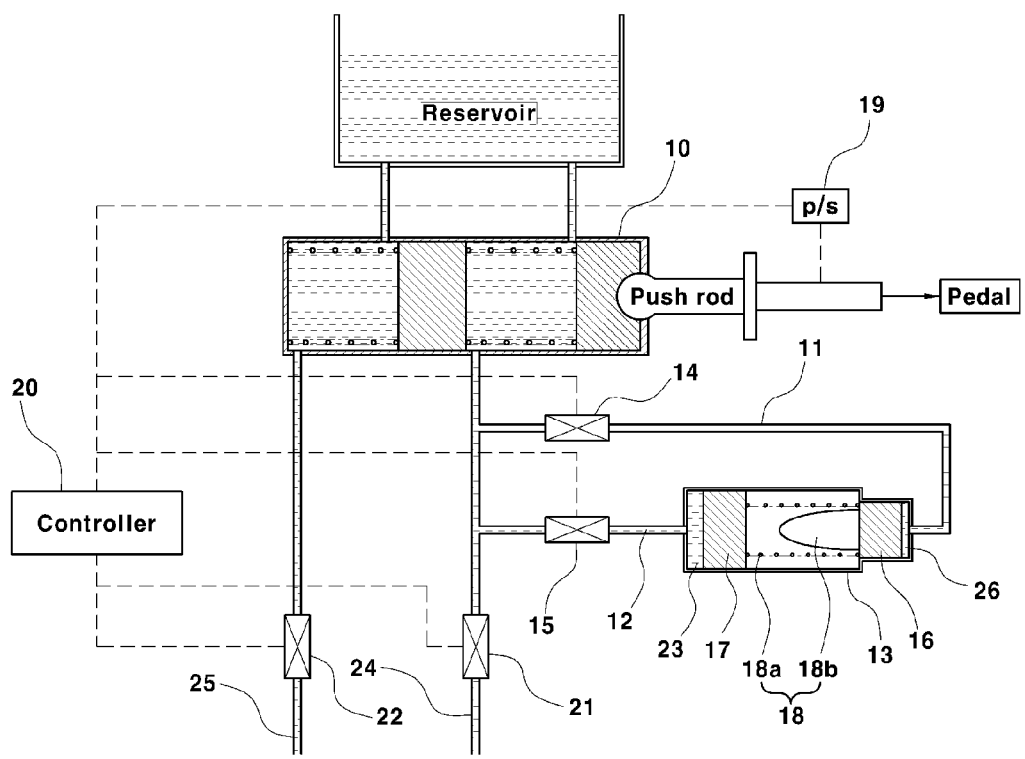
FIG. 3 is an exemplary schematic diagram showing a pushing force controlling apparatus for a pedal simulator according to another exemplary embodiment of the present invention.

FIG. 3 is an exemplary schematic diagram showing a pushing force controlling apparatus for a pedal simulator according to another exemplary embodiment of the present invention.

As shown in FIG. 3, the pedal pushing force characteristics may be differently controlled by varying the areas of the first piston 16 and the second piston 17 in the simulator cylinder 13, and since a pipe connecting structure, an installation location of a solenoid valve, a disposition of pistons, and application of a buffering member may be the same as those of the first embodiment, a detailed description thereof will be omitted.

However, the second piston 17 installed at a rear side of the interior of the simulator cylinder 13 may have a substantially small diameter as compared with the first piston 16, thus the second piston 17 may be disposed at apart of the cylinder having an inner diameter corresponding to the outer diameter thereof (e.g., a rear part of the cylinder having a substantially small diameter as compared with the diameter of the body of the simulator cylinder). Accordingly, a cross-section of the second chamber 23 of the second piston 17 may be smaller than a cross-section of the first chamber 26 of the first piston 16. Thus, when the cross-sections of the first piston 16 and the second piston 17 are different, for example, when the cross-section of the first piston 16 is set to be larger than the cross-section of the second piston 17, pushing force characteristics may be made different in the following way.

Figure 4A:
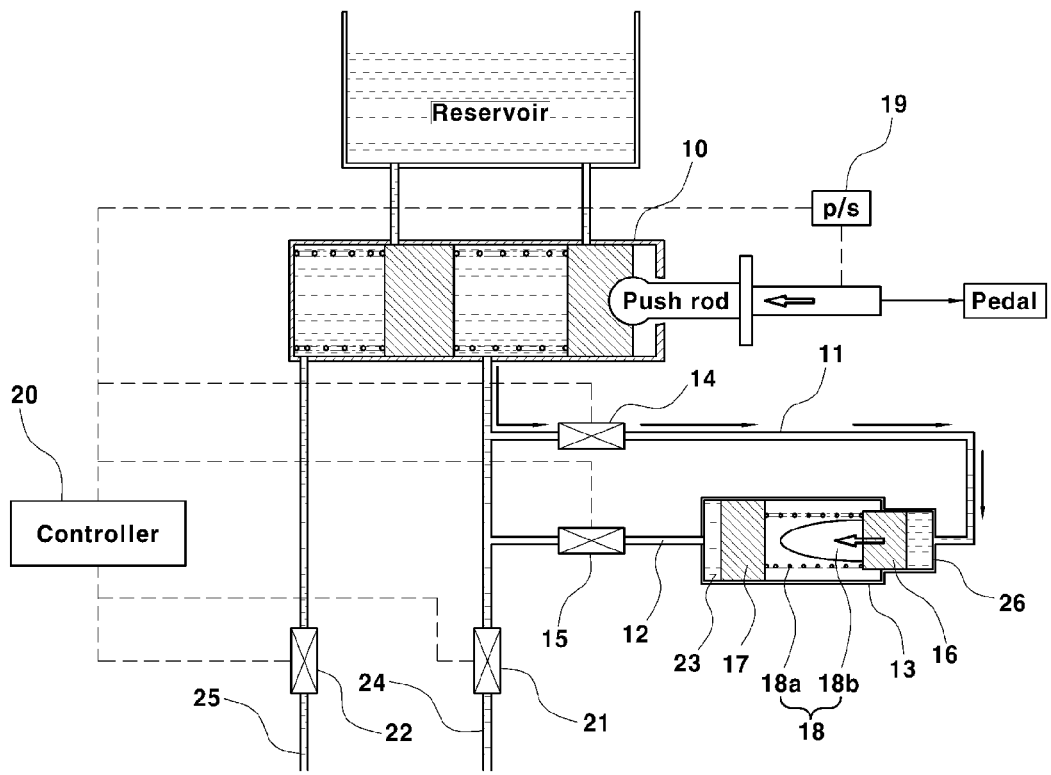
FIGS. 4A and 4B are exemplary schematic diagrams showing in-use states of the pushing force controlling apparatus for a pedal simulator of FIG. 3 according to an exemplary embodiment of the present invention.
Figure 4B:
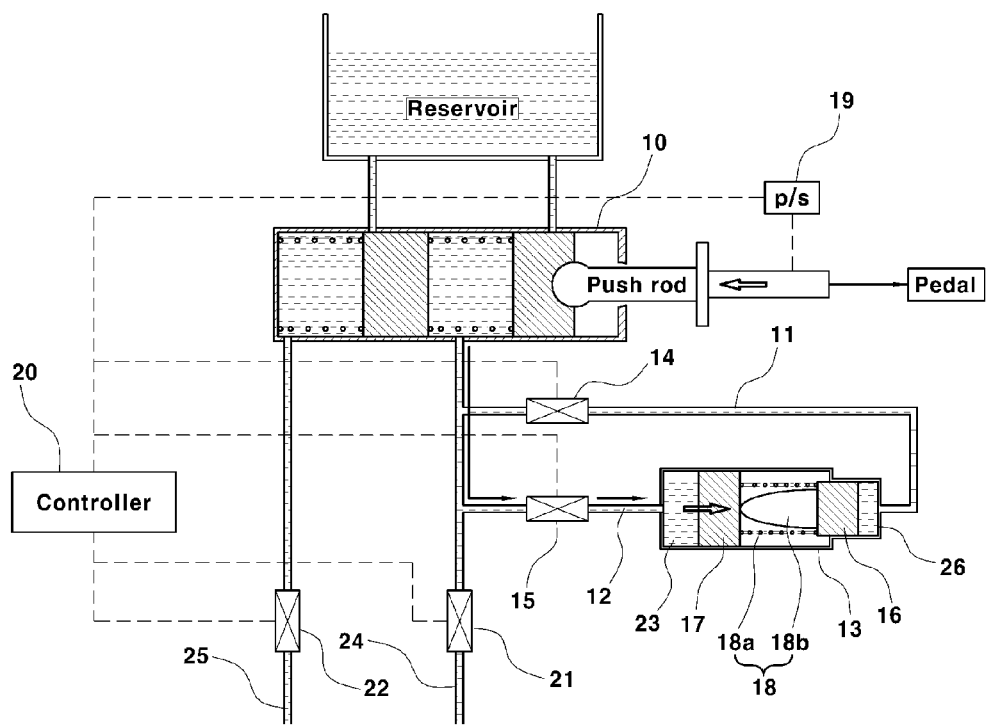

As shown in FIGS. 4A and 4B, when the first solenoid valve 14 is opened and the second solenoid valve 15 is closed, fluid may be transferred to the first chamber 26 to move the first piston 16 during an operation of the pedal, and a force corresponding to an area of the first piston multiplied by a pressure of the first pipe may be balanced with a force generated by deformation of the buffering member 18 (e.g., first condition).

Furthermore, when the second solenoid valve 15 is opened and the first solenoid valve 14 is closed, fluid may be transferred to the second chamber 26 to move the second piston 17 during an operation of the pedal, a force corresponding to an area of the second piston multiplied by a pressure of the second pipe may be balanced with a force generated by deformation of the buffering member 18 (e.g., second condition).

When the buffering member is deformed by the same amount in the first condition and the second condition, a pressure applied to the second pipe 12 may be higher since the area of the second piston 17 is smaller. Since the pushing force of the pedal corresponds to a value obtained by multiplying an area of the main piston of the master cylinder by a pressure of the cylinder, a higher pushing force may be generated when the pedal simulator is operated in the second condition.

When fluid flows into the second chamber 23 to be operated in the second condition, since an area of the second piston 17 is smaller, a pedal stroke by which the buffering member is deformed by the same amount may be shorter than that in the first condition. In particular, when the areas of the first piston and the second piston are set to be different, the initial positions of the first piston and the second piston may be changed by opening and closing the first solenoid valve and the second solenoid valve and stroke to pushing force characteristics may be freely controlled by simultaneously performing the controls.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A pushing force controlling apparatus for a pedal simulator, comprising:
   a simulator cylinder in which a first pipe and a second pipe extending from a master cylinder are connected to a front side and a rear side thereof, respectively;
   a first solenoid valve and a second solenoid valve installed in the first pipe and the second pipe, respectively;

a first piston and a second piston disposed at a front side and a rear side of an interior of the simulator cylinder; and a buffering member installed between the first piston and the second piston, wherein pedal pushing force characteristics are controlled by variably setting a position of the second piston in the simulator cylinder using an amount of fluid provided from the master cylinder during an operation of a pedal.

2. The pushing force controlling apparatus of claim 1, wherein the pedal pushing force characteristics are controlled by varying setting areas of the first piston and the second piston in the simulator cylinder.

3. The pushing force controlling apparatus of claim 2, wherein an amount of fluid provided into the simulator cylinder to set a position of the second piston is controlled based on an opening/closing time of a solenoid valve depending on a signal detected by the pedal stroke sensor or an operation time of the pedal.

4. The pushing force controlling apparatus of claim 2, wherein the buffering member interposed between the first piston and the second piston corresponds to a spring, a rubber, and a combination of the spring and the rubber.

5. The pushing force controlling apparatus of claim 2, wherein the first solenoid valve is connected to a first chamber of the simulator cylinder and the second solenoid valve is connected to a second chamber of the simulator cylinder to control the amount of fluid entering the chambers based on opening/closing operations of the solenoid valves.

6. A pushing force controlling apparatus for a pedal simulator, comprising:

a simulator cylinder in which a first pipe and a second pipe extending from a master cylinder are connected to a front side and a rear side thereof, respectively;

a first solenoid valve and a second solenoid valve installed in the first pipe and the second pipe, respectively;

a first piston and a second piston disposed at a front side and a rear side of an interior of the simulator cylinder; and a buffering member installed between the first piston and the second piston, wherein pedal pushing force characteristics are controlled by variably setting a position of the first piston in the simulator cylinder by using an amount of fluid provided from a master cylinder during an operation of a pedal.

* * * * *